No. 862,486. PATENTED AUG. 6, 1907.
J. KIESLER.
POWER SHOVEL.
APPLICATION FILED NOV. 30, 1906.

2 SHEETS—SHEET 1.

Witnesses:

Inventor.
Joseph Kiesler,
By Dyrenforth, Dyrenforth, Lee & Wiles,
Att'ys.

No. 862,486.
PATENTED AUG. 6, 1907.
J. KIESLER.
POWER SHOVEL.
APPLICATION FILED NOV. 30, 1906.
2 SHEETS—SHEET 2.
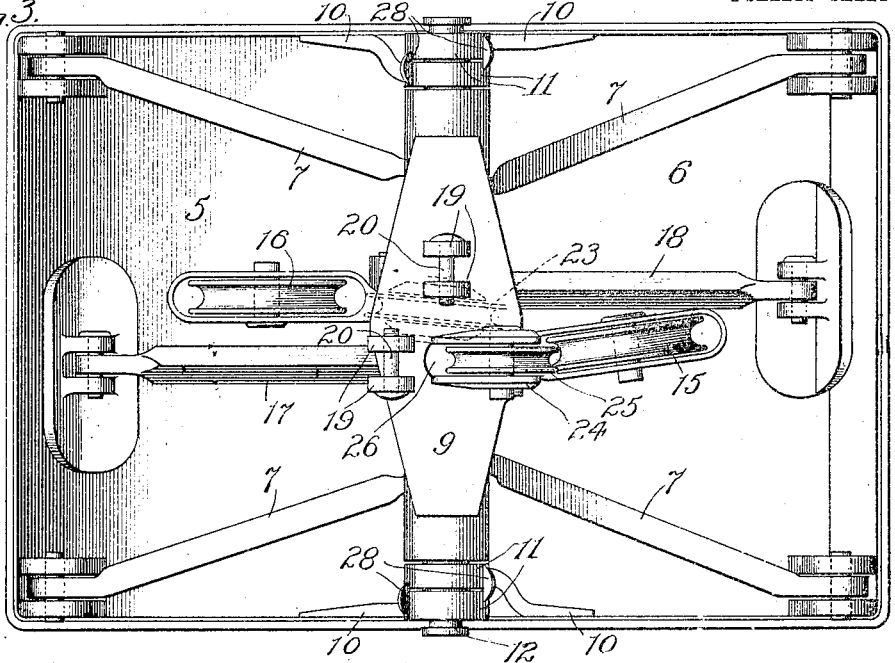
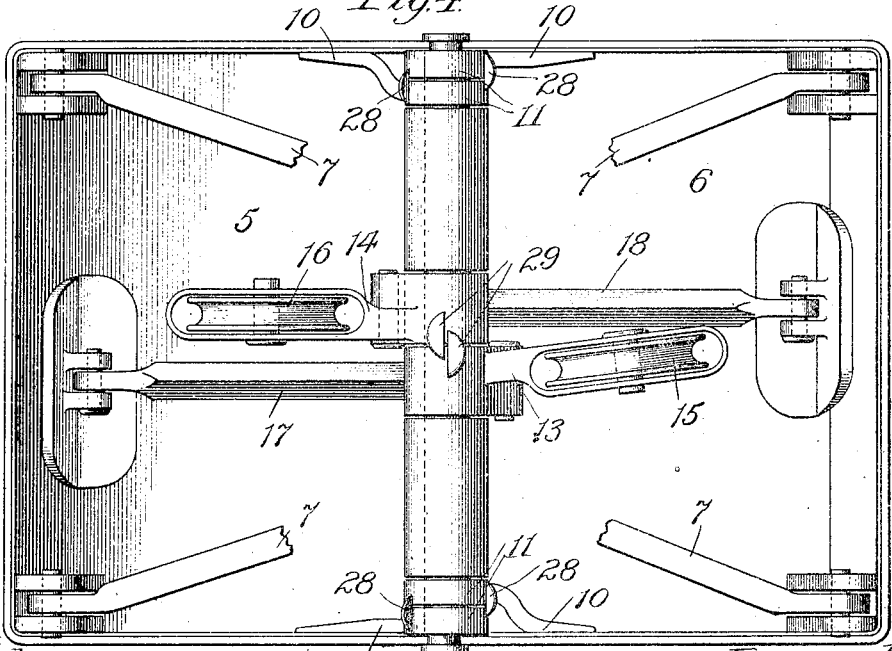
Witnesses:
Inventor
Joseph Kiesler,

UNITED STATES PATENT OFFICE.

JOSEPH KIESLER, OF CHICAGO, ILLINOIS.

POWER-SHOVEL.

No. 862,486.　　　　Specification of Letters Patent.　　　　Patented Aug. 6, 1907.

Application filed November 30, 1906. Serial No. 345,688.

*To all whom it may concern:*

Be it known that I, JOSEPH KIESLER, a citizen of the United States, residing at Chicago, in the county of Cook and State of Illinois, have invented a new and useful Improvement in Power-Shovels, of which the following is a specification.

My invention relates to an improvement in power shovels, and particularly to the class used for unloading coal, grain and the like material, as from cars or boats, and for analogous uses.

The type of shovel to which my improvements relate comprises, generally stated, a pair of pivoted scoop-shaped coöperating jaws provided with means for closing them on the material to be transferred, thereby to fill the shovel, and means for opening the jaws to discharge their contents at the point to which the shovel is transferred.

My primary object is to provide a construction of power shovel of the class referred to employing novel and peculiarly effective mechanism for controlling the opening and closing of the jaws, or scoop-sections. To this end I have devised the construction illustrated in the accompanying drawings, in which—

Figure 1:
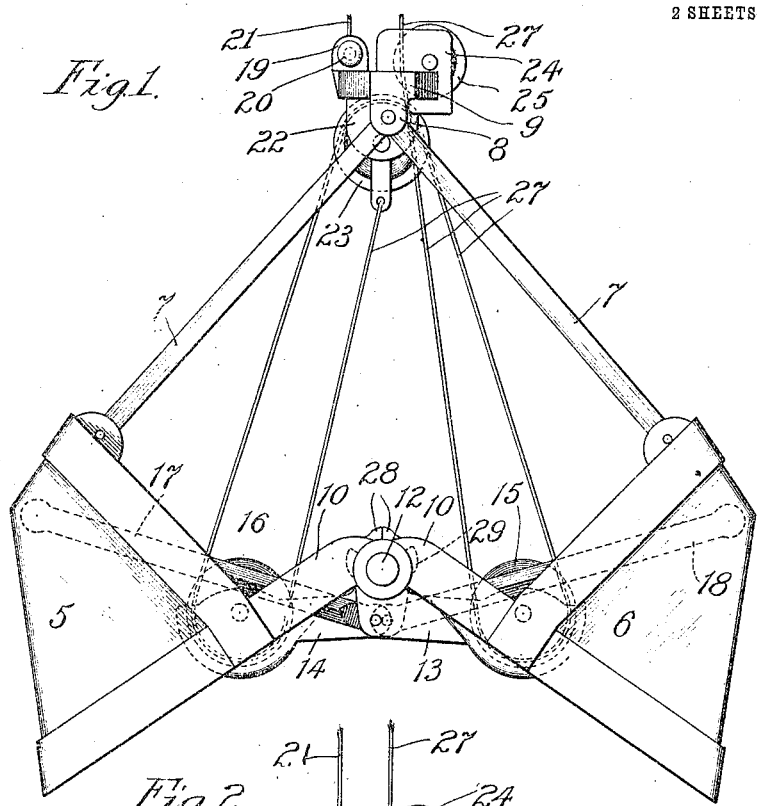
Figure 2:
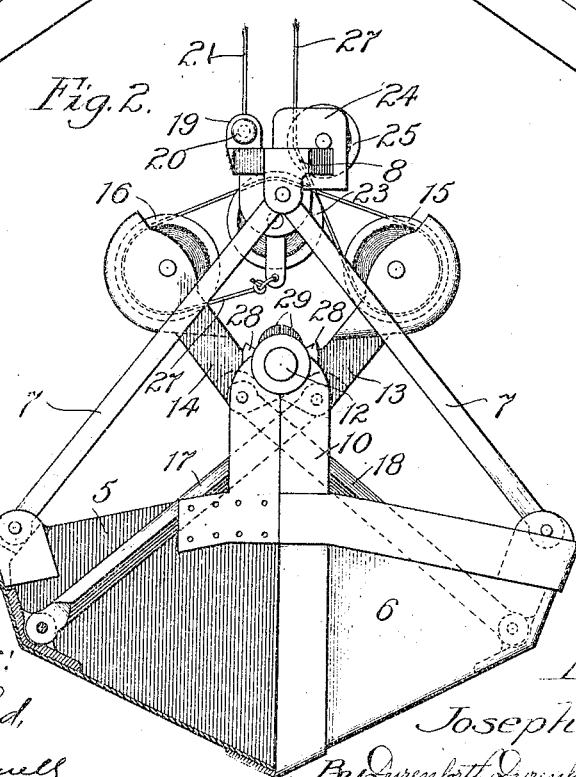

Figure 1 is a view in side elevation of a shovel of the class referred to, embodying my improvements, the shovel being represented in open condition for filling; Fig. 2, a similar view of the same, showing the shovel in closed condition; Fig. 3, a top plan view; and Fig. 4, a broken top plan view with a portion of the hanging gear removed.

The shovel comprises two similar scoop-shaped sections 5 and 6, from the two outer corners of each of which upwardly extend links 7, which are pivotally connected at their lower ends to the scoop-sections and at their upper ends are journaled to ears 8 provided on the outer ends of a head or hanger-block 9. Extending beyond the upper edge of each scoop-section from its inner corners are arms 10 which terminate in collars 11 at which they are pivoted independently of each other to the ends of a shaft 12 positioned above the abutting edges of the scoop-sections, to provide a hinged connection between the sections for permitting them to be swung toward and away from each other and thereby open and close the shovel. Journaled on the shaft 12, on opposite sides of its longitudinal center, at their short arms, are bell-crank levers 13 and 14. Near the outer ends of the long arms of the bell-cranks 13 and 14 are journaled pulleys 15 and 16, respectively. The bell-cranks are operatively connected with the opposite scoop-sections by means of links or tension-members 17 and 18, respectively, each connected at one end to an angle of the bell-cranks and at the opposite ends either by a pivotal connection as shown, or by a rigid connection therewith to the opposite scoop-sections, at points below those at which the links 7 are pivoted, so that the links 17 and 18 cross each other near their upper ends when the scoop-sections are swung to the closed position illustrated in Fig. 2.

Extending upward from the block 9, near its longitudinal center, are two sets of ears 19, the sets being preferably arranged in different vertical planes relative to each other, for the purpose hereinafter explained. Each set of ears supports a bolt 20 to either one of which the dump or hold cable 21 may be secured. Journaled in lugs 22 carried on the under side of the block 9 near its longitudinal center, is a pulley 23. On the upper side of the block, near its longitudinal center, are provided upwardly extending ears 24 between which is journaled a pulley 25, the block 9 being provided with an opening 26, below the pulley 25, to permit of the travel through the block and against the pulley, of the cable 27, for the purpose hereinafter described. On the outer end of each arm 10 is a stop-lug 28, these lugs projecting laterally from the arm, as shown in Fig. 3, to extend into the path of movement of each other, and they are so positioned that they will not engage until the scoop-sections swing to the desired open position, whereupon they serve to limit further swinging of the sections in that direction. Provided on the ends of the short arms of the bell-cranks are lugs 29, similar to the lugs 28, which are so positioned as to almost contact with each other when the sections are swung to closed position. The object in providing the lugs 29 is to afford means whereby, should the scoop-sections, or link or lever-mechanism become impaired during the operation of the shovel, the scoop closing and opening mechanism will be prevented from collapsing, with the result of maintaining the scoop in closed condition until it is desired to empty it.

The normal relative positions of the scoop-sections and lever mechanism described are those shown in Fig. 1, in which the weight of the lever mechanism and pulleys 15 and 16 counterbalance that of the scoop-sections, thereby causing the latter to swing on their pivots to the open position in which the scoop is ready for filling.

The operation of the shovel is as follows: The shovel is suspended to be raised and lowered by the cable 21. When there is no upward pull on the cable 27 the scoop-sections assume the open position shown in Fig. 1, in which the shovel may be lowered into the pile of material from which a load is to be transferred. The cable 27 is thereupon pulled upward, thereby causing the pulleys 15 and 16 to rise and turn the bell-cranks on their pivots with the result of drawing the links or tension-members 17 and 18 with them and consequently causing the scoop-sections to turn on the shaft 12 to the closed position indicated in Fig. 2. The shovel, resting at its open scoop-sections against the pile of material, is caused to dip into the pile and close on a portion of it, when the sections are swung to closed position. The sections are held in closed position during the lifting of the shovel, and to the point of discharge, through the medium of the cable 27, by a constant pull thereon. When it is desired to discharge the contents of the shovel the cable 27 is slackened, thereby causing the weight of the load to turn the levers and scoop-sections to their open positions for dumping.

The pulleys 25, 15, 23 and 16, as shown in Fig. 3, are preferably arranged to be angularly disposed with relation to each other, thereby permitting the portions of the lifting cable 27, which pass over these pulleys, to be out of rubbing contact with each other and thus prevent wear upon the cable during its traverse of the pulleys.

In using a power-shovel for purposes of transferring material from a boat or car, especially, it is desirable that the shovel be lowered into different positions therein to effect as nearly a thorough cleaning up thereof as possible, as, for example, in unloading a car to remove the material from its corners it is necessary that the shovel be lowered into it at a right-angle to its former lowered position. The change of position referred to, as far as I am aware, has heretofore been effected by a workman who, as the shovel is being lowered into the material, grasps the shovel and swings it upon its supporting cables to the desired position. To obviate this objectionable practice I provide the plurality of sets of ears and bolts described, forming connecting or attaching points on the head for the dump and hold cable, to either of which bolts the cable may be attached, the sets of ears being so arranged, as described, as to cause the shovel, by reason of the change in the center of gravity to assume different positions, depending upon the point of attachment at which the cable is secured.

What I claim as new, and desire to secure by Letters Patent, is—

1. In a power-shovel, the combination with a pair of co-operating scoop-sections pivoted adjacent to their inner meeting edges on a shaft and pivotally suspended near their outer edges on a support above said shaft, of means for controlling the opening and closing of said shovel, comprising a pair of levers pivoted on said shaft to extend on opposite sides thereof, links pivotally connecting said levers with the opposite scoop-sections, and means for upwardly turning said levers on their pivots, for the purpose set forth.

2. In a power-shovel, the combination with a pair of co-operating scoop-sections pivoted together adjacent to their inner meeting edges on a shaft, and pivotally suspended near their outer edges from a head, of means for controlling the opening and closing of said shovel, comprising a pair of bell-crank levers pivoted on said shaft to extend on opposite sides thereof, links pivotally connecting the angles of said bell-cranks with the opposite scoop-sections, and means for upwardly turning said bell-cranks, for the purpose set forth.

3. In a power-shovel, the combination with a pair of co-operating scoop-sections pivoted together adjacent to their inner meeting edges on a shaft and pivotally suspended near their outer edges from a head, of means for controlling the opening and closing of said shovel, comprising a pair of bell-crank levers pivoted to said shaft to extend on opposite sides thereof, a pulley journaled near the outer end of each said bell-crank, links pivotally connecting the angles of said bell-cranks with the opposite scoop-sections, and means for raising said pulleys, for the purpose set forth.

4. In a power-shovel, the combination with a pair of co-operating scoop-sections pivoted together adjacent to their inner meeting edges on a shaft and pivotally suspended near their outer edges from a head, of means for controlling the opening and closing of said shovel, comprising a pair of levers pivoted to said shaft to extend on opposite sides thereof, links pivotally connecting said levers with the opposite scoop-sections, means for upwardly turning said levers on their pivots, and coöperating stops carried by said scoop-sections for limiting the degree of separation of the scoop-sections.

5. In a power-shovel, the combination of a pair of co-operating scoop-sections, a shaft on which said sections are pivoted adjacent to their inner meeting edges, a hanger-block carrying a shaft, links pivoted on said last-named shaft and to the outer corners of said scoop-sections, bell-crank levers fulcrumed at their short arms on said first-named shaft to extend on opposite sides thereof, a pulley journaled in the outer end of each said bell-crank, links pivotally connecting the angles of said bell-cranks with the opposite scoop-sections at a point below the connection of said first-named links with said sections, a pulley journaled on the under side of said hanger-block, a pulley on the upper side of said block, and an operating cable bearing against said last-named pulley, extending downward and around one of the pulleys on the bell-cranks, then over the other of said pulleys on the hanger-block, and then over the pulley on the other bell-crank, the end of the cable adjacent to said last referred to pulley being secured to said block, for the purpose set forth.

6. In a power-shovel, the combination of a pair of shovel-sections, a pivot connecting said sections, a pair of pivotally supported levers equipped with shoulders adapted to limit the rotation of the levers in the closing direction, links connecting said levers with the shovel-sections, a hanger-block, links connecting the hanger-block with the outer corners of the shovel-sections, and a cable connected with the hanger-block and levers.

7. In a power-shovel, the combination of a pair of shovel-sections, a shaft on which said sections are pivoted, a hanger-block, a dump-cable connected therewith, links connecting the outer corners of the shovel-sections with the hanger-block, levers pivoted near their inner ends on said shaft, a lifting-cable connected with said hanger-block and with the outer end portions of said levers, and links connected with intermediate portions of said levers and with said shovel-sections between the biting edges of the shovel-sections and the points of connection with said first-named links.

8. In a power-shovel, the combination of a head, a hold and dump cable carrying the head, relatively movable shovel-sections pivoted together, means for opening and closing said sections, and means on said head forming a plurality of points of attachment for said cable, at any one of which points said cable may be attached, for the purpose set forth.

9. In a power-shovel, the combination of a pair of shovel-sections, a pivot connecting said sections, a head from which said sections are suspended, a pulley on said head, lever mechanism for raising said sections upon their pivots, pulleys carried by said lever-mechanism, and a cable engaging said pulleys for operating the lever-mechanism, the pulleys on the lever-mechanism and head being angularly disposed with relation to each other, for the purpose set forth.

10. The combination of a pair of shovel-sections, a pivot connecting said sections, a hanger-block located above said sections and linked to the outer portions thereof, a pair of levers supported on said pivot, a lifting cable connected with the levers and hanger-block, a dump-cable connected with the hanger-block, and tension-members connecting the levers to the shovel-sections and adapted, when the levers are turned, to pull the lower portions of the shovel sections together.

11. The combination of a pair of shovel-sections, a shaft on which said sections are pivoted, a hanger-block above said shaft, thrust-links connecting the hanger-block with the outer portions of the shovel-sections, levers pivoted on said shaft, tension-members located in planes beneath the shaft and connecting said levers with intermediate portions of the shovel-sections, whereby a closing pull is exerted on the shovel-sections when the levers are swung toward the hanger-block, a dump-cable connected with the hanger-block, and a lifting-cable connected with the levers and with the hanger-block.

JOSEPH KIESLER.

In the presence of—
J. H. LANDES,
C. W. WASHBURNE.